(12) United States Patent
Guo et al.

(10) Patent No.: US 8,266,154 B2
(45) Date of Patent: Sep. 11, 2012

(54) IDENTIFYING TOP CONTENT CONTRIBUTORS IN ONLINE SOCIAL NETWORKS

(75) Inventors: Lei Guo, Milpitas, CA (US); Yihong Zhao, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 250 days.

(21) Appl. No.: 12/710,119

(22) Filed: Feb. 22, 2010

(65) Prior Publication Data
US 2011/0208749 A1 Aug. 25, 2011

(51) Int. Cl.
*G06F 17/30* (2006.01)
(52) U.S. Cl. .......... 707/748; 707/723; 707/771
(58) Field of Classification Search .......... 707/748, 707/771, 741, 731, 723, 709; 706/47, 50, 706/55, 59; 709/206, 207, 224
See application file for complete search history.

(56) References Cited

U.S. PATENT DOCUMENTS

| | | | |
|---|---|---|---|
| 7,912,701 B1 * | 3/2011 | Gray et al. ................. | 704/9 |
| 2011/0208749 A1 * | 8/2011 | Guo et al. .................. | 707/748 |
| 2011/0289207 A1 * | 11/2011 | Liu et al. .................... | 709/224 |
| 2011/0314013 A1 * | 12/2011 | Wang et al. ................. | 707/731 |
| 2012/0089681 A1 * | 4/2012 | Chowdhury et al. ......... | 709/206 |

OTHER PUBLICATIONS

Adamic, L. et al., "The political blogsphere and the 2004 U.S. election: Divided they blog.," *Proc. of Workshop on Link Discovery*, 2005.
Adar, E. et al.; Tracking Information Epidemics in Blogspace,, Proc. of IEEE/WIC/ACM Int'l Conference on Web Intelligence; Sep. 19-25, 2005.
Bell, F.; "The Rise of User-Generated Content,", http://www.entrepreneur.com/technology/managingtechnology/web20columnistfrankbell/article 183432; Aug. 27, 2007.
Cheng, X.; "Statistics and Social Networking of You Tube Videos," Proc. of Int'l Workshop Quality of Service IOQoS, Jun. 2-4, 2008.
Crovella, M. E.et al.; "Self-similarity in World Wide Web Traffic, Evidence and Possible Causes," Proc. of ACM SIGMETRICS, vol. 5; Dec. 1997.
Gjoka, M. et al.; "Poking Facebook: Characterization of OSN Applications," Proc. of ACM SIGCOMM WOSN, Aug. 2008.
Gruhl, D., et al.; Information Diffusion Through Blogspace,: Proc. World Wide Web Conference, May 2004.
Guo, L, et al., "Measurements, Analysis and Modeling of Bit Torrent-like Systems," Proc. of ACM SiGCOMM Internet Measurement Conference, Oct. 2005.
Guo, L., et al.; "The Stretched Exponential Distribution of Internet Media Access Patterns," Proceedings of 27th ACM Symposium on Principles of Distributed Computing, 2008.

(Continued)

*Primary Examiner* — Jean M Corrielus
(74) *Attorney, Agent, or Firm* — SNR Denton US LLP (57) ABSTRACT

One particular embodiment accesses a plurality of user profiles corresponding to a plurality of users and a plurality of content objects; ranks the users in descending order based on a number of content objects each of the users has contributed to the social network; represents in log space ranks of the users versus in log space numbers of content objects contributed by the users; determines a threshold rank based on an increasing rate of the ranks of the users, a decreasing rate of the numbers of content objects, and a predetermined value in the log space; and identifies from among the users, those users ranked at and above the threshold rank as high-volume content contributors for the social network. The users belong to a social network; and each of the users has contributed at least one of the content objects to the social network.

18 Claims, 5 Drawing Sheets

OTHER PUBLICATIONS

Kempe, D. et al.; "Maximizing the Spread of Influence Through a Social Network," KDD '03 Proceedings of the Ninth ACM SIGKDD International Conference on Knowledge Discovery and Data Mining, 2003.

Kittur, A., et al.; Power of the Few vs Wisdom of the Crowd: Wikipedia and the Rise of the Bourgeoisie, Apr. 28-May 3, 2007.

Kumar, A., et al.; "On the Bursty Evolution of Blogspace," Proceedings of the 12th Int'l Conference on WorldWideWeb, May 20-24, 2003.

Laherrere, J. et al.; "Stretched Exponential Distributions in Nature and Economy: Fat Tails" with Characteristic Scales, European Physical Journal B. vol. 2, pp. 568-576, Jan. 28, 1998.

Leskovec, J. et al., "The Dynamics of Viral Marketing", Proc. of ACM Transactions on the Web, May 2007.

Leskovec, J. et al.; "Microscopic Evolution of Social Networks," 17th International World Wide Web Conference, Aug. 24-27, 2008.

Leskovec, J. et al.; "Planetary-scale Views on a Large Instant-Messaging Network." Proc of World Wide Web Conference, Apr. 21-25, 2008.

Leskovec, J. et al.; "Statistical Properties of Community Structure in Large Social and Information Networks," Proc. of World Wide Web Conference, Apr. 21-25, 2008.

Leskovec, J., et al.; "Cascading Behavior in Large Block Graphic," Proc. of Siam Int'l Conference on Data Mining 2007.

Richardson, M. et al.; "Mining Knowledge—Sharing Sites for Viral Marketing," Proc of 8th ACM SIGCOMM on Internet Measurement IMC, 2002.

Seshadri, M. et al.; "Mobile Call Graphs: Beyond Power-law and Lognormal Distributions." Proc of ACM SIGDD, Aug. 24-27, 2008.

Stutzbach, D. et a;.; "Understanding Churn in Peer-to-peer Networks," Proc. of ACM SIGCOMM IMC, vol. 6, 2006.

Voss, J., "Measuring Wikipedia," Proc. of 10th Int'l Conference of the Int'l society of Scientometrics & Informetrics Jul. 24-28, 2005.

Wang, M. et al.; "Data Mining Meets Performance Evaluation: fast Algorithms for Modeling Bursty Traffic," Proc. of IEEEE 18th Int'l Conference on Data Engineering, Feb. 26-Mar. 1, 2002.

Watts, D.; "A Simple Model of Global Cascades on Random Networks," Proc. of the National Academy of Sciences, Apr. 30, 2002.

Xiao, Z., et al.; "Understanding Instant Messaging Traffic Characteristics," Proc. of 27th Int'l Conference on Distributed Computing Systems, Jun. 25-27, 2007.

\* cited by examiner

IDENTIFYING TOP CONTENT CONTRIBUTORS IN ONLINE SOCIAL NETWORKS

TECHNICAL FIELD

The present disclosure generally relates to identifying high-volume content contributors among social-network users.

BACKGROUND

The Internet brings forth many benefits, one of which is for network users to be socially connected with friends, families, and colleagues easily and conveniently, regardless of their actual geographical locations. There are many online social networks or forums, some of which, such as Facebook (http://www.facebook.com), MySpace (http://www.myspace.com), Flickr (http://www.flickr.com), and LinkedIn (http://www.linkedin.com), enjoy great success. These online social networks attract a great number of participants (i.e., social-network users) that contribute various types of content on the network. For example, social-network users may post messages, images, videos, audios, etc. on the network so that they may be shared among the social-network users or with the public in general. In general, a social-network user's activities in an online social network may include authoring, posting, or viewing network content and communicating (i.e., networking) with other social-network users.

Online social networks may be classified into two categories according to their different purposes. The first category includes networking oriented online social networks, such as Facebook and LinkedIn. These online social networks usually emphasize more on the social networking aspect of the networks, and the social relationship may be considered as the basis of such online social networks. With networking oriented online social networks, content sharing is mainly among friends. The second category includes knowledge-sharing oriented online social networks, such as blog networks, question-answer networks, and viral video networks. These online social networks usually emphasize more on the sharing of knowledge or network content. With knowledge-sharing oriented online social networks, the networks often are not driven by the underlying social relationships; instead, the networks are formed through their users' common interests in the shared content.

SUMMARY

The present disclosure generally relates to identifying high-volume content contributors among social-network users.

Particular embodiments access a plurality of user profiles corresponding to a plurality of users and a plurality of content objects; rank the users in descending order based on a number of content objects each of the users has contributed to the social network; represent in log space ranks of the users versus in log space numbers of content objects contributed by the users; determine a threshold rank based on an increasing rate of the ranks of the users, a decreasing rate of the numbers of content objects, and a predetermined value in the log space; and identify from among the users, those users ranked at and above the threshold rank as high-volume content contributors for the social network. In particular embodiments, the users belong to a social network; and each of the users has contributed at least one of the content objects to the social network.

These and other features, aspects, and advantages of the disclosure are described in more detail below in the detailed description and in conjunction with the following figures.

DETAILED DESCRIPTION

The present disclosure is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Online social networks enable the social-network users to network with and share content among their users. The rapid development of these online social networks has attracted significant attentions from research communities. A number of studies have been conducted to examine various properties of the different online social networks. One particular point of interest with respect to an online social network may be to identify high-volume content contributors among its users.

Often, the users of an online social network may contribute content to the social community, which may then be shared among the users of the online social network or with the public in general. The content contributed by the social-network users may have any format, such as, without limitation, text, image, video, audio, executable, etc. A social-network user may contribute a content object to the network by making the content object available on the network so that it may be accessed (e.g., viewed, downloaded, etc.) by other social-network users. Note that a contributor of a particular content object may not necessarily be the original creator of the content object. For example, a social-network user may post to an online social network a digital photograph taken by another social-network user or by a friend who may not be a user of the online social network. In this case, the social-network user who actually posts the digital photograph to the network is not really the creator of the digital photograph (i.e., the photographer who has taken the digital photograph).

Sometimes, it may be useful to identify those users of an online social network who have contributed relatively larger numbers of content objects to the network. Such social-network users may be referred to as "high-volume content contributors". High-volume content contributors may play an important role on information propagation throughout an online social network and may form the core of the online social network.

In the past, online social networks have attempted to identify high-volume content contributors among their users by setting fixed thresholds. For example, an online social network may designate any of its users who has contributed at least a certain number of content objects to the network as a high-volume content contributor. However, using fixed thresholds to identify high-volume content contributors may be inflexible and may not be easily adapted for different online social networks.

To provide a flexible method of identifying high-volume content contributors among the users of an online social network, particular embodiments may analyze the number of content objects contributed to an online social network by each user of the online social network to discover patterns of distribution of the content contributions. Based on such patterns, particular embodiments may identify the high-volume content contributors among the users of an online social network. More specifically, particular embodiments may identify the high-volume content contributors among the users of an online social network based on the discovery that the distribution of the content contributed by the social-network users is a stretched exponential distribution.

Figure 1:
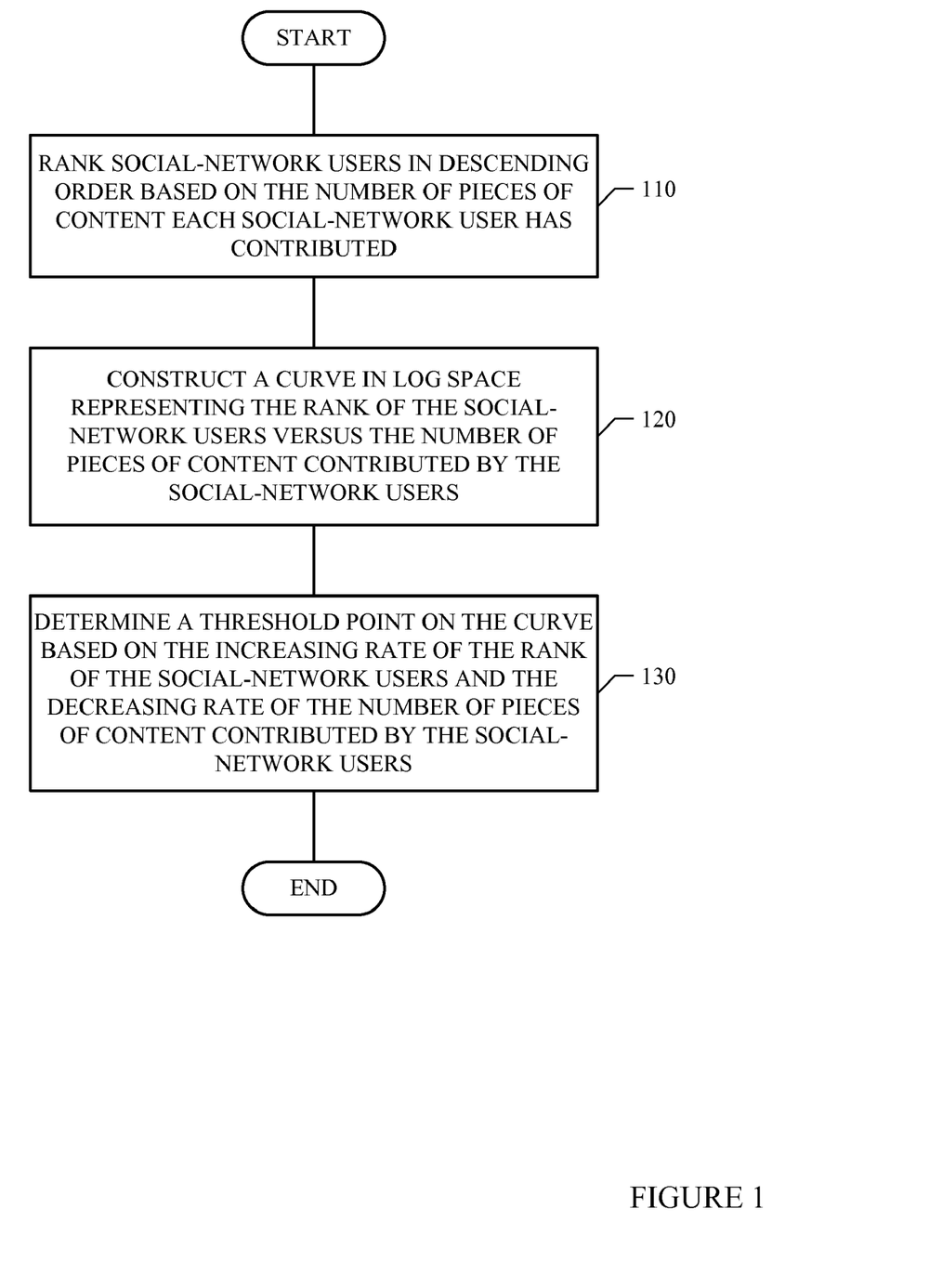
FIG. 1 illustrates an example method of determining a ranking threshold that may be used to identify high-volume content contributors among the social-network users.
Figure 2A:
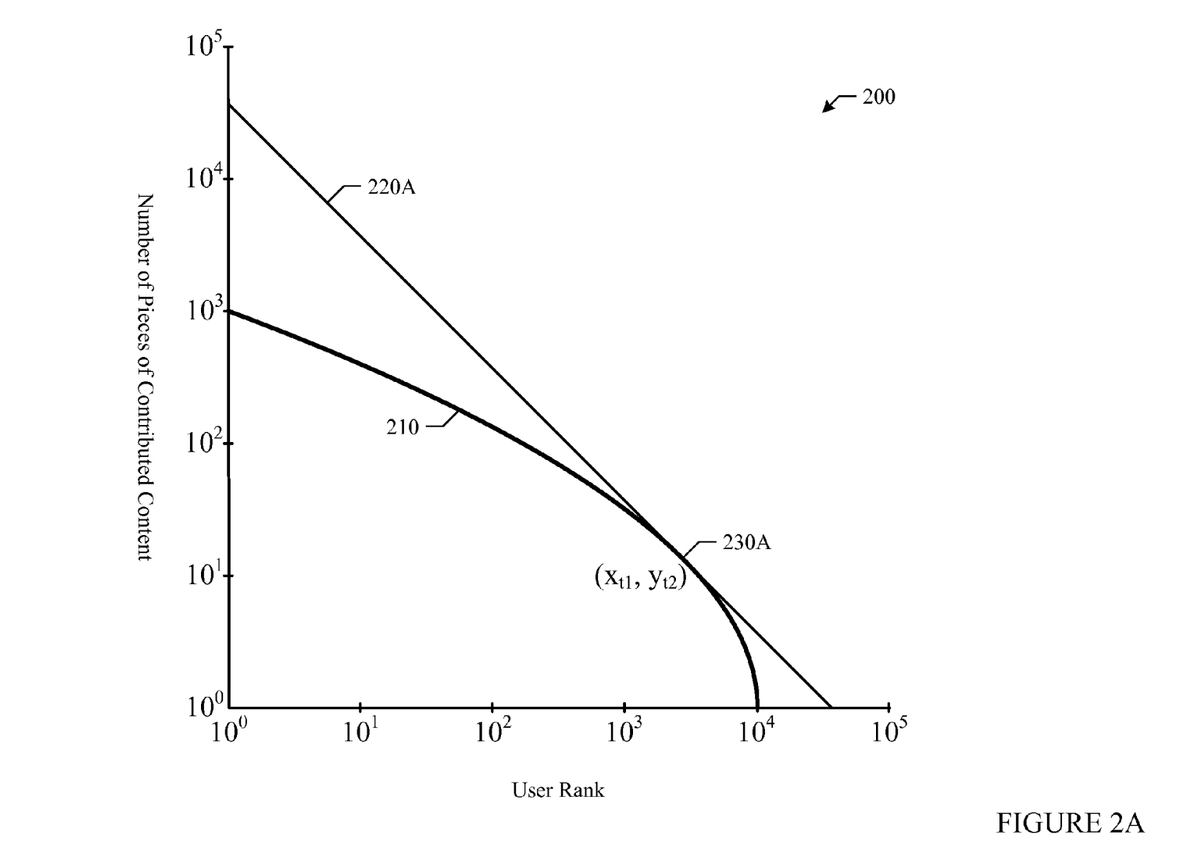
FIGS. 2A and 2B illustrate two example tangent lines, respectively, of an example curve representing the rank of the social-network users versus the number of content objects contributed by the social-network users.
Figure 2B:
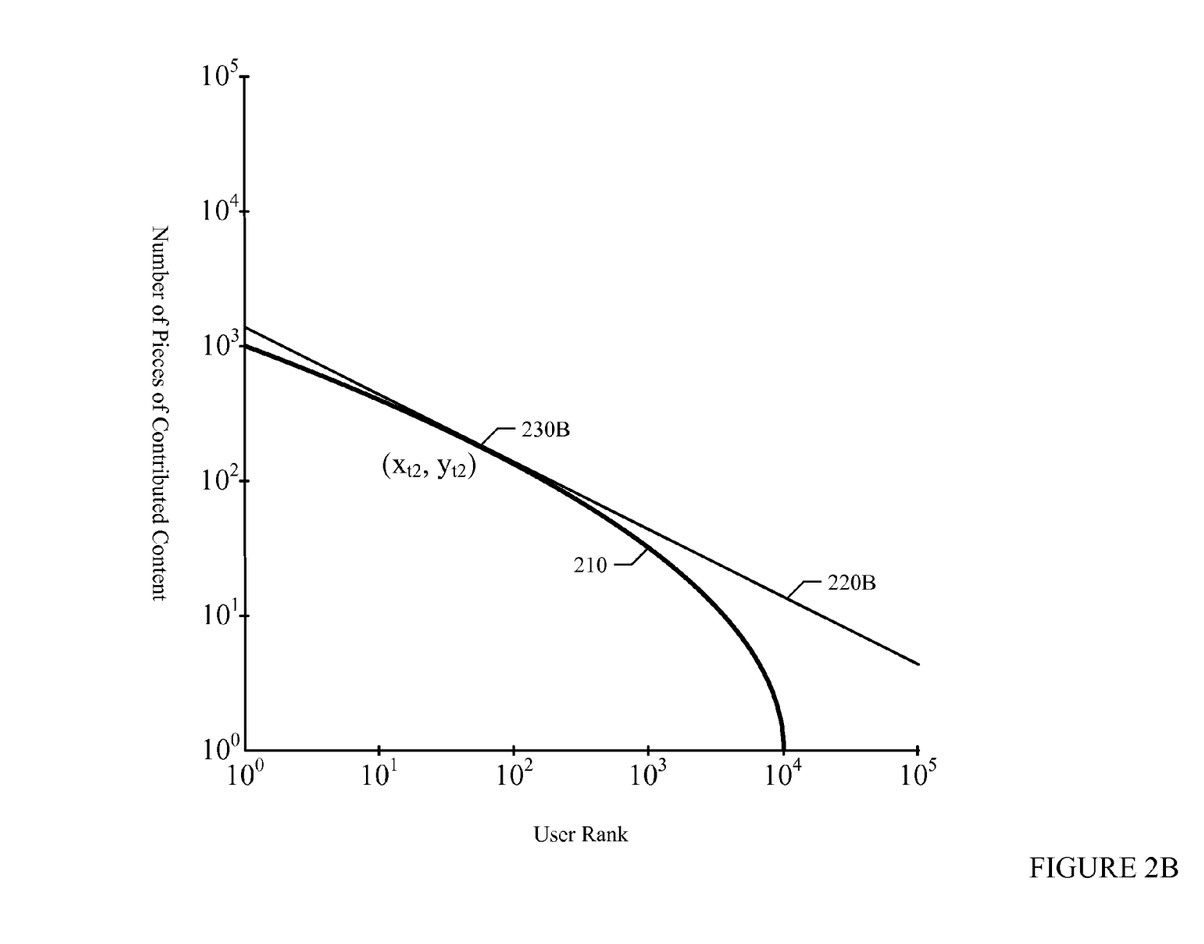

FIG. 1 illustrates an example method of determining a ranking threshold that may be used to identify high-volume content contributors among the social-network users. FIGS. 2A and 2B illustrate two example tangent lines, respectively, of an example curve representing the rank of the social-network users versus the number of content objects contributed by the social-network users. The steps of FIG. 1 may be described in connection with the example curve and the example tangent lines illustrated in FIGS. 2A and 2B.

An online social network may maintain a record (e.g., a log) of the individual content objects contributed by each of its users. By processing and analyzing such record, particular embodiments may rank the users of a social network in descending order based on the number of content objects each social-network users has contributed to the network, as illustrated in step 110. That is, those social-network users who have contributed relatively larger numbers of content objects are ranked higher than those social-network users who have contributed relatively smaller numbers of content objects. For example, the first-ranked social-network users has contributed the most number of content objects to the network. Consequently, the high-volume content contributors may be identified among those users having relatively higher ranks. In particular embodiments, each of the social-network users under analysis has contributed at least one content object to the online social network.

There may be three types of content generally available on an online social network. The first may be original content created by the social-network users who contribute (e.g., post) them to the network. The second may be content created by others but posted to the online social network by its users (i.e., non-original content obtained by the social-network users who contribute them to the network). The third may be advertisements and spam. When ranking the social-network users based on the number of content objects contributed by each social-network user, particular embodiments may only consider the original content created by the social-network user (i.e., the first type of content) who have contributed them to the network. Alternatively, particular embodiments may consider both the original content and the non-original content (i.e., first and second type of content) contributed by the social-network users. Alternatively, particular embodiments may consider all content contributed by the social-network users.

Particular embodiments may construct a curve in log space that represents the rank of the social-network users and the number of content objects contributed by the social-network users, as illustrated in step 120. In particular embodiments, the log space is 10-based log space. To construct the curve, for each of the social-network users, particular embodiments may plot a point in the log space, with the x-coordinate of the point corresponding to the rank of the social-network user and the y-coordinate of the point corresponding to the number of content objects contributed to the network by the social-network user. Multiple social-network users may provide multiple points in the log space and these points may form a curve.

FIG. 2A illustrates a 10-based log space 200 with an example curve 210. The x-axis of log space 200 corresponds to the rank of the social network users and the y-axis of log space 200 corresponds to the number of content objects contributed by the social-network user. Note that because curve 210 is plotted in the 10-based log space 200, along the x-axis, the first unit represents user ranks between 1 and 10, the second unit represents user ranks between 10 and 100, the third unit represents user ranks between 100 and 1000, and so on. Similarly, along the y-axis, the first unit represents numbers of content pieces between 1 and 10, the second unit represents numbers of content pieces between 10 and 100, the third unit represents numbers of content pieces between 100 and 1000, and so on.

As curve 210 illustrates, the distribution of the content contributions by the social-network users follows the stretched exponential distribution, which may be defined as:

$$y^c = -a \log x + b, \quad (1A)$$

with $$b = 1 + a \log n; \quad (1B)$$

where: (1) x represents the rank of a social-network user; (2) y represents the number of content objects contributed by the social-network user; (3) n is the total number of users in the online social network who have contributed one or more content objects to the network; and (4) a and C are two constants, with c reflecting the effort to create a piece of contributed content or the quality of a piece of contributed content.

Particular embodiments may determine the value of c based on empirical data, which may be obtained from offline data analysis. Particular embodiments may determine the value of a as the mean of the stretched exponential distribution as $$\langle x \rangle = a^{\frac{1}{c}} \Gamma\left(1 + \frac{1}{c}\right) \text{ or}$$

$$\langle x \rangle = e^{\frac{1}{a}} a^{\frac{1}{c}} \left( \Gamma\left(1 + \frac{1}{c}\right) - \gamma\left(1 + \frac{1}{c}, \frac{1}{a}\right) \right).$$

Stretched exponential distribution is described in more detail in *The Stretched Exponential Distribution of Internet Media Access Patterns*, by Lei Guo et al.

Let Y=log y and X=log x. Then EQUATION (1A) may be further derived as:

$$c \log y = \log(-a \log x + b), \text{ and}$$

$$cY = \log(-aX + b). \quad (2)$$

Because x represents the rank of a social-network user, $$\frac{dx}{x}$$

represents the increasing rate of the rank of the social-network users. Similarly, because y represents the number of content objects contributed by the social-network user, $$-\frac{dy}{y}$$

represents the decreasing rate of the number of content objects contributed by the social-network users.

As illustrated in FIG. 2A, at the beginning part (i.e., toward the left) of curve 210, the decreasing rate of the number of content objects contributed by the social-network users is smaller than the increasing rate of the rank of the social-network users, until a point (e.g., point 230A having coordinates $(x_{t1}, y_{t1})$) where the decreasing rate of the number of content objects contributed by the social-network users equals the increasing rate of the rank of the social-network users $$\left(\text{i.e.}, -\frac{dy}{y} = \frac{dx}{x}\right).$$

Particular embodiments may use this point as a threshold point to distinguish the high-volume content contributors from among the social-network users.

However, particular embodiments may provide a more flexible way of determining a threshold point for identifying the high-volume content contributors from among the social-network users. Particular embodiments may associate a weight, denoted by $\alpha$, with the increasing rate of the rank of the social-network users, such that $$-\frac{dy}{y} = \alpha \frac{dx}{x}.$$

Particular embodiments may use the point on the curve where $$-\frac{dy}{y} = \alpha \frac{dx}{x}$$

as a threshold point to distinguish the high-volume content contributors from among the users of an online social network, as illustrated in step 130. In particular embodiments, the value of $\alpha$ may be adjusted to control the actual threshold point on the curve. Note that $$-\frac{dy}{y} = \alpha \frac{dx}{x}$$

is mathematically equivalent to $$\frac{-\frac{dy}{y}}{\frac{dx}{x}} = \alpha.$$

The above relationship then yields $$\frac{dY}{dX} = -\alpha = -\frac{a}{c}\frac{1}{-aX+b} = -\frac{a}{c}\frac{1}{y^c},$$

$$X = \frac{b}{a} - \frac{1}{c\alpha} = \frac{1+a\log n}{a} - \frac{1}{c\alpha} = \frac{1}{a} - \frac{1}{c\alpha} + \log n,$$

$$x = ne^{\left(\frac{1}{a} - \frac{1}{c\alpha}\right)}, \text{ and}$$

$$y = \left(\frac{a}{c\alpha}\right)^{\frac{1}{c}}.$$

To represent the above mathematical analysis graphically, particular embodiments may construct a tangent line to the curve. In particular embodiments, the tangent line may have a predetermined slop. In geometry, a tangent line to a curve at a given point is a straight line that just touches the curve at that point. The point may be referred to as the point of tangency. As it passes through the point of tangency, the tangent line is going in the same direction as the curve. In particular embodiments, the slop of the tangent line may control at which point the tangent line touches (i.e., intercepts) the curve. Thus, conceptually, the slop of the tangent line may have the same effect as $\alpha$. That is, the slop of the tangent line may be adjusted to control the actual threshold point on the curve.

FIG. 2A illustrates a tangent line 220A having a slop value of $-1$. Tangent line 220A intercepts curve 210 as a point of tangency 230A, which has a coordinate of $(x_{t1}, y_{t1})$. FIG. 2B illustrates a different tangent line 220B having a slop value of $-0.5$. Tangent line 220A intercepts curve 210 as a different point of tangency 230B, which has a coordinate of $(x_{t2}, y_{t2})$. As tangent lines 220A and 220B illustrate, because these two tangent lines have different slops, they intercept the save curve 210 at two different points of tangency.

Particular embodiments may determine the point of tangency where the tangent line touches (i.e., intercepts) the curve. This point of tangency, which corresponds to the point where $$-\frac{dy}{y} = \alpha \frac{dx}{x},$$

may be used as a threshold for identifying high-volume content contributors. In particular embodiments, those social-network users ranked at or above the x-coordinate of the threshold point may be considered as the high-volume content contributors for an online social network.

To determine a threshold point with a predetermined $\alpha$ (i.e., a point of tangency resulting from a tangent line with a predetermined slop), particular embodiments may perform the following steps. First, for each of the social-network users, compute log y (i.e., the log of the number of content objects contributed by the social-network user) and log x (i.e., the log of the rank of the social-network user). Second, for x ranging from 1 to n (note that x is the rank of the social-network users and n is the total number of social-network users who have contributed content to the network), iteratively compute (1) the decreasing rate of the number of content objects contributed by the social-network users as $-(\log y_{x+1} - \log y_x)$ (note that $y_x$ is the number of content objects contributed by the social-network user ranked at x and $y_{x+1}$ is the number of content objects contributed by the social-network user ranked at x+1); (2) the increasing rate of the rank of the social network users as $$\frac{dx}{x} = \frac{1}{x};$$

and $$\frac{-\frac{dy}{y}}{\frac{dx}{x}} = \frac{-(\log y_{x+1} - \log y_x)}{\frac{1}{x}} = x(\log y_x - \log y_{x+1}), \quad (3)$$

until $x(\log y_x - \log y_{x+1})$ equals $\alpha$ or approximately equals $\alpha$ with an acceptable accuracy.

The point at which the iterative computation stops may be considered as the threshold point. In particular embodiments, the social-network users ranked at or above the x-coordinate of the threshold point may be identified as the high-volume content contributors.

Figure 3:
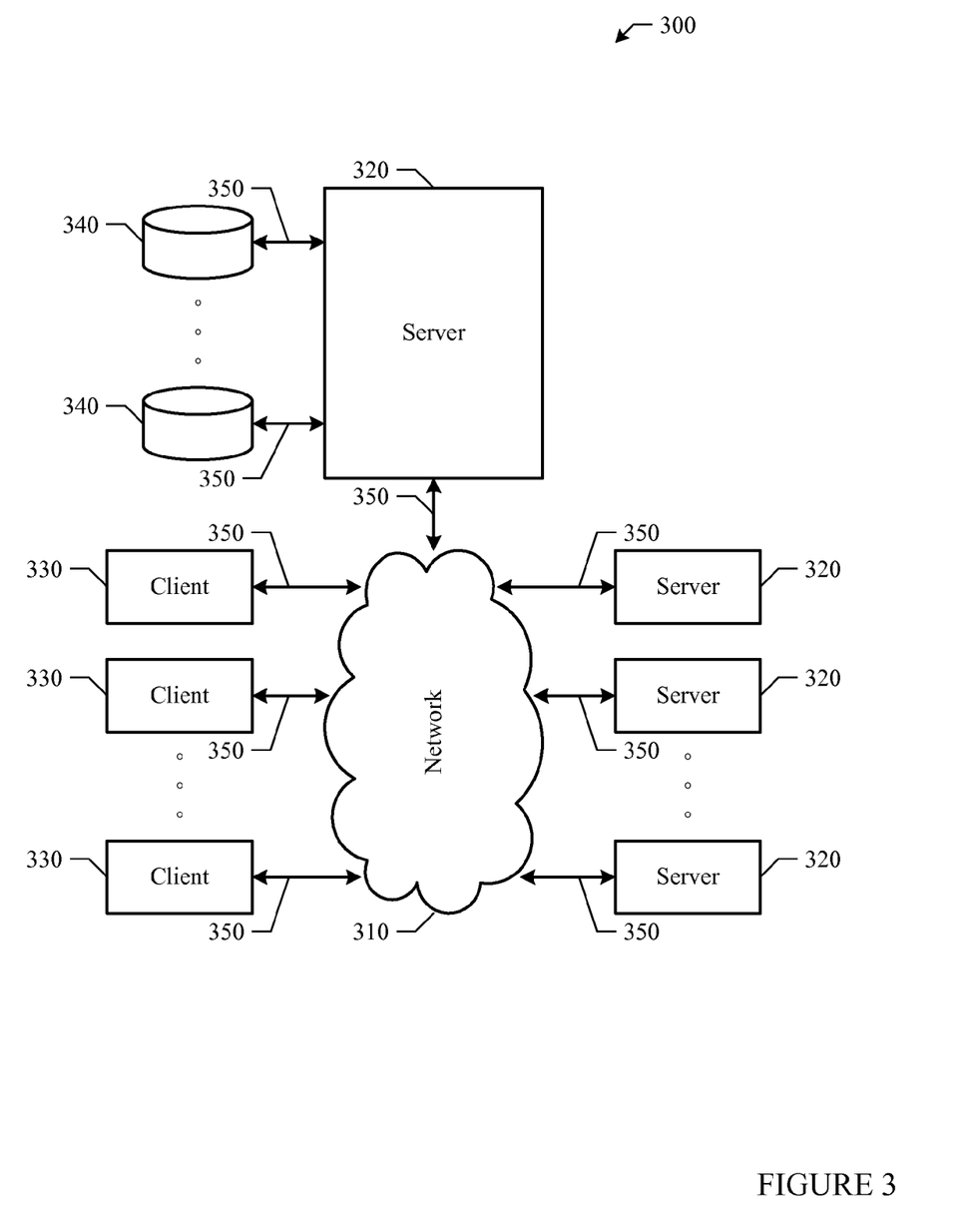
FIG. 3 illustrates an example network environment.

Particular embodiments may be implemented in a network environment. FIG. 3 illustrates an example network environment 300. Network environment 300 includes a network 310 coupling one or more servers 320 and one or more clients 330 to each other. In particular embodiments, network 310 is an intranet, an extranet, a virtual private network (VPN), a local area network (LAN), a wireless LAN (WLAN), a wide area network (WAN), a metropolitan area network (MAN), a communications network, a satellite network, a portion of the Internet, or another network 310 or a combination of two or more such networks 310. The present disclosure contemplates any suitable network 310.

One or more links 350 couple servers 320 or clients 330 to network 310. In particular embodiments, one or more links 350 each includes one or more wired, wireless, or optical links 350. In particular embodiments, one or more links 350 each includes an intranet, an extranet, a VPN, a LAN, a WLAN, a WAN, a MAN, a communications network, a satellite network, a portion of the Internet, or another link 350 or a combination of two or more such links 350. The present disclosure contemplates any suitable links 350 coupling servers 320 and clients 330 to network 310.

In particular embodiments, each server 320 may be a unitary server or may be a distributed server spanning multiple computers or multiple datacenters. Servers 320 may be of various types, such as, for example and without limitation, web server, news server, mail server, message server, advertising server, file server, application server, exchange server, database server, or proxy server. In particular embodiments, each server 320 may include hardware, software, or embedded logic components or a combination of two or more such components for carrying out the appropriate functionalities implemented or supported by server 320. For example, a web server is generally capable of hosting websites containing web pages or particular elements of web pages. More specifically, a web server may host HTML files or other file types, or may dynamically create or constitute files upon a request, and communicate them to clients 330 in response to HTTP or other requests from clients 330. A mail server is generally capable of providing electronic mail services to various clients 330. A database server is generally capable of providing an interface for managing data stored in one or more data stores.

In particular embodiments, each client 330 may be an electronic device including hardware, software, or embedded logic components or a combination of two or more such components and capable of carrying out the appropriate functionalities implemented or supported by client 330. For example and without limitation, a client 330 may be a desktop computer system, a notebook computer system, a netbook computer system, a handheld electronic device, or a mobile telephone. A client 330 may enable an network user at client 330 to access network 310. A client 330 may have a web browser, such as Microsoft Internet Explorer or Mozilla Firefox, and may have one or more add-ons, plug-ins, or other extensions, such as Google Toolbar or Yahoo Toolbar. A client 330 may enable its user to communicate with other users at other clients 330. The present disclosure contemplates any suitable clients 330.

In particular embodiments, one or more data storages 340 may be communicatively linked to one or more severs 320 via one or more links 350. In particular embodiments, data storages 340 may be used to store various types of information. In particular embodiments, the information stored in data storages 340 may be organized according to specific data structures. Particular embodiments may provide interfaces that enable servers 320 or clients 330 to manage (e.g., retrieve, modify, add, or delete) the information stored in data storage 340.

Particular embodiments may be implemented as hardware, software, or a combination of hardware and software. For example and without limitation, one or more computer systems may execute particular logic or software to perform one or more steps of one or more processes described or illustrated herein. One or more of the computer systems may be unitary or distributed, spanning multiple computer systems or multiple datacenters, where appropriate. The present disclosure contemplates any suitable computer system. In particular embodiments, performing one or more steps of one or more processes described or illustrated herein need not necessarily be limited to one or more particular geographic locations and need not necessarily have temporal limitations. As an example and not by way of limitation, one or more computer systems may carry out their functions in "real time," "offline," in "batch mode," otherwise, or in a suitable combination of the foregoing, where appropriate. One or more of the computer systems may carry out one or more portions of their functions at different times, at different locations, using different processing, where appropriate. Herein, reference to logic may encompass software, and vice versa, where appropriate. Reference to software may encompass one or more computer programs, and vice versa, where appropriate. Reference to software may encompass data, instructions, or both, and vice versa, where appropriate. Similarly, reference to data may encompass instructions, and vice versa, where appropriate.

One or more computer-readable storage media may store or otherwise embody software implementing particular embodiments. A computer-readable medium may be any medium capable of carrying, communicating, containing, holding, maintaining, propagating, retaining, storing, transmitting, transporting, or otherwise embodying software, where appropriate. A computer-readable medium may be a biological, chemical, electronic, electromagnetic, infrared, magnetic, optical, quantum, or other suitable medium or a combination of two or more such media, where appropriate. A computer-readable medium may include one or more nanometer-scale components or otherwise embody nanometer-scale design or fabrication. Example computer-readable storage media include, but are not limited to, compact discs (CDs), field-programmable gate arrays (FPGAs), floppy disks, floptical disks, hard disks, holographic storage devices, integrated circuits (ICs) (such as application-specific integrated circuits (ASICs)), magnetic tape, caches, programmable logic devices (PLDs), random-access memory (RAM) devices, read-only memory (ROM) devices, semiconductor memory devices, and other suitable computer-readable storage media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose computer system may execute software implementing particular embodiments, where appropriate.

Figure 4:
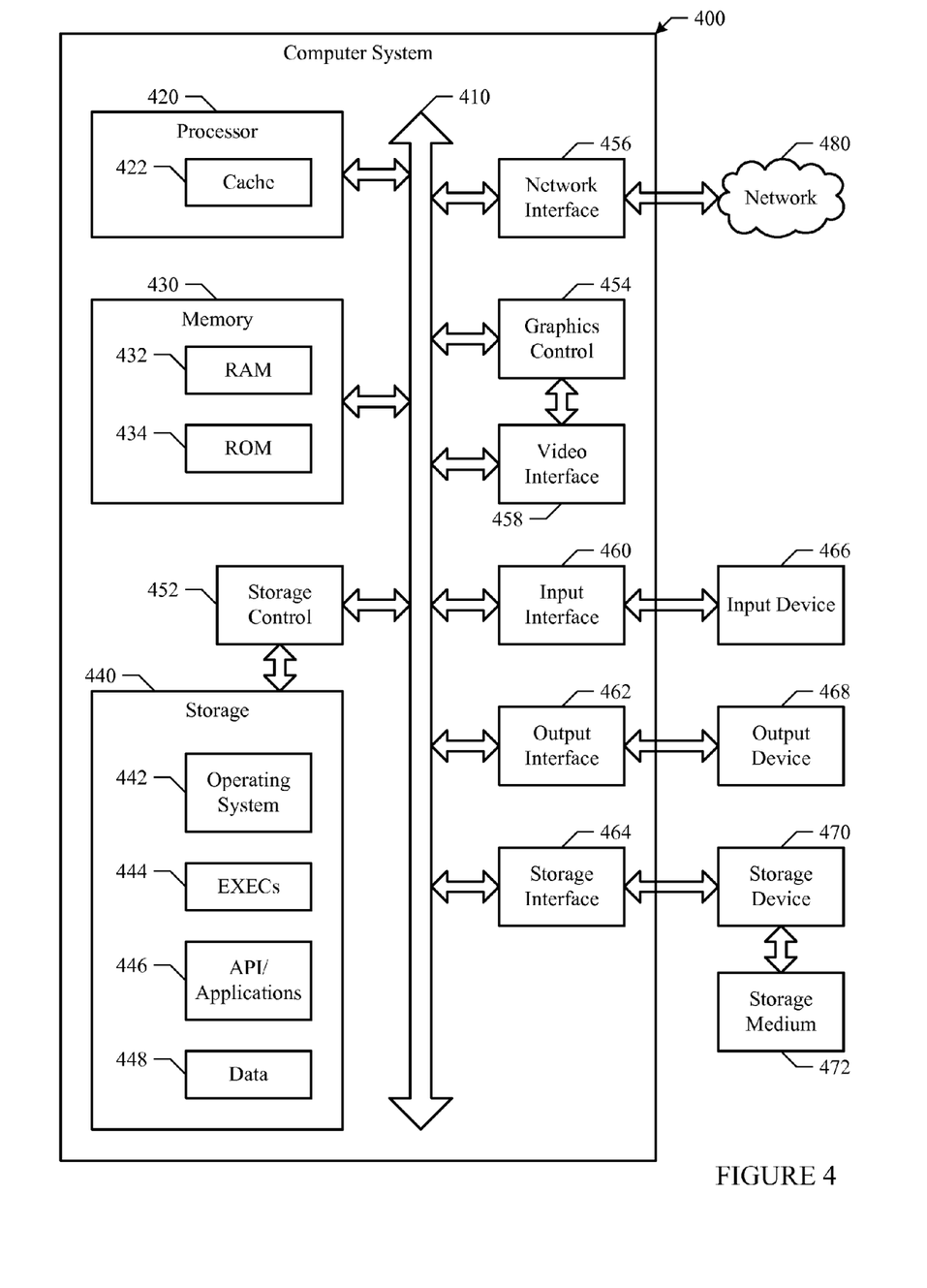
FIG. 4 illustrates an example computer system.

For example, FIG. 4 illustrates an example computer system 400 suitable for implementing one or more portions of particular embodiments. Although the present disclosure describes and illustrates a particular computer system 400 having particular components in a particular configuration, the present disclosure contemplates any suitable computer system having any suitable components in any suitable configuration. Moreover, computer system 400 may have take any suitable physical form, such as for example one or more integrated circuit (ICs), one or more printed circuit boards (PCBs), one or more handheld or other devices (such as mobile telephones or PDAs), one or more personal computers, or one or more super computers.

System bus 410 couples subsystems of computer system 400 to each other. Herein, reference to a bus encompasses one or more digital signal lines serving a common function. The present disclosure contemplates any suitable system bus 410 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 400 includes one or more processors 420 (or central processing units (CPUs)). A processor 420 may contain a cache 422 for temporary local storage of instructions, data, or computer addresses. Processors 420 are coupled to one or more storage devices, including memory 430. Memory 430 may include random access memory (RAM) 432 and read-only memory (ROM) 434. Data and instructions may transfer bidirectionally between processors 420 and RAM 432. Data and instructions may transfer unidirectionally to processors 420 from ROM 434. RAM 432 and ROM 434 may include any suitable computer-readable storage media.

Computer system 400 includes fixed storage 440 coupled bi-directionally to processors 420. Fixed storage 440 may be coupled to processors 420 via storage control unit 452. Fixed storage 440 may provide additional data storage capacity and may include any suitable computer-readable storage media. Fixed storage 440 may store an operating system (OS) 442, one or more executables 444, one or more applications or programs 446, data 448, and the like. Fixed storage 440 is typically a secondary storage medium (such as a hard disk) that is slower than primary storage. In appropriate cases, the information stored by fixed storage 440 may be incorporated as virtual memory into memory 430.

Processors 420 may be coupled to a variety of interfaces, such as, for example, graphics control 454, video interface 458, input interface 460, output interface 462, and storage interface 464, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 456 may couple processors 420 to another computer system or to network 480. With network interface 456, processors 420 may receive or send information from or to network 480 in the course of performing steps of particular embodiments. Particular embodiments may execute solely on processors 420. Particular embodiments may execute on processors 420 and on one or more remote processors operating together.

In a network environment, where computer system 400 is connected to network 480, computer system 400 may communicate with other devices connected to network 480. Computer system 400 may communicate with network 480 via network interface 456. For example, computer system 400 may receive information (such as a request or a response from another device) from network 480 in the form of one or more incoming packets at network interface 456 and memory 430 may store the incoming packets for subsequent processing. Computer system 400 may send information (such as a request or a response to another device) to network 480 in the form of one or more outgoing packets from network interface 456, which memory 430 may store prior to being sent. Processors 420 may access an incoming or outgoing packet in memory 430 to process it, according to particular needs.

Computer system 400 may have one or more input devices 466 (which may include a keypad, keyboard, mouse, stylus, etc.), one or more output devices 468 (which may include one or more displays, one or more speakers, one or more printers, etc.), one or more storage devices 470, and one or more storage medium 472. An input device 466 may be external or internal to computer system 400. An output device 468 may be external or internal to computer system 400. A storage device 470 may be external or internal to computer system 400. A storage medium 472 may be external or internal to computer system 400.

Particular embodiments involve one or more computer-storage products that include one or more computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, floptical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 430 may include one or more computer-readable storage media embodying software and computer system 400 may provide particular functionality described or illustrated herein as a result of processors 420 executing the software. Memory 430 may store and processors 420 may execute the software. Memory 430 may read the software from the computer-readable storage media in mass storage device 430 embodying the software or from one or more other sources via network interface 456. When executing the software, processors 420 may perform one or more steps of one or more processes described or illustrated herein, which may include defining one or more data structures for storage in memory 430 and modifying one or more of the data structures as directed by one or more portions the software, according to particular needs. In addition or as an alternative, computer system 400 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising: by one or more computing devices,
    accessing a plurality of user profiles corresponding to a plurality of users and a plurality of content objects, wherein:
        the users belong to a social network; and
        each of the users has contributed at least one of the content objects to the social network;
    ranking the users in descending order based on a number of content objects each of the users has contributed to the social network;
    representing in log space ranks of the users versus in log space numbers of content objects contributed by the users;
    determining a threshold rank based on an increasing rate of the ranks of the users, a decreasing rate of the numbers of content objects, and a predetermined value in the log space; and
    identifying from among the users, those users ranked at and above the threshold rank as high-volume content contributors for the social network.

2. The method recited in claim 1, wherein the ranks of the users versus the numbers of content objects contributed by the users is represented as a curve in the log space, within the ranks of the users are represented by x coordinates of the log space and the numbers of content objects contributed by the users are represented by y coordinates of the log space.

3. The method recited in claim 2, wherein:
    the increasing rate of the ranks of the users is defined as $$\frac{dx}{x};$$

the decreasing rate of the numbers of content objects is defined as $$-\frac{dy}{y};$$

and
    the threshold rank is determined based on $$-\frac{dy}{y} = \alpha \frac{dx}{x},$$

where α denotes the predetermined value.

4. The method recited in claim 3, wherein the threshold rank is where the increasing rate of the ranks of the users equals the decreasing rate of the numbers of content objects.

5. The method recited in claim 3, wherein the predetermined value controls the threshold rank.

6. The method recited in claim 1, wherein each of the content objects contributed to the social network is created by the user contributing the content object.

7. A system, comprising:
    a memory comprising instructions executable by one or more processors; and
    one or more processors coupled to the memory and operable to execute the instructions, the one or more processors being operable when executing the instructions to:
        access a plurality of user profiles corresponding to a plurality of users and a plurality of content objects, wherein:
            the users belong to a social network; and
            each of the users has contributed at least one of the content objects to the social network;
        rank the users in descending order based on a number of content objects each of the users has contributed to the social network;
        represent in log space ranks of the users versus in log space numbers of content objects contributed by the users;
        determine a threshold rank based on an increasing rate of the ranks of the users, a decreasing rate of the numbers of content objects, and a predetermined value in the log space; and identify from among the users, those users ranked at and above the threshold rank as high-volume content contributors for the social network.

8. The system recited in claim 7, wherein the ranks of the users versus the numbers of content objects contributed by the users is represented as a curve in the log space, within the ranks of the users are represented by x coordinates of the log space and the numbers of content objects contributed by the users are represented by y coordinates of the log space.

9. The system recited in claim 8, wherein:
the increasing rate of the ranks of the users is defined as $$\frac{dx}{x};$$

the decreasing rate of the numbers of content objects is defined as $$-\frac{dy}{y};$$

and
the threshold rank is determined based on $$-\frac{dy}{y} = \alpha \frac{dx}{x},$$

where α denotes the predetermined value.

10. The system recited in claim 9, wherein the threshold rank is where the increasing rate of the ranks of the users equals the decreasing rate of the numbers of content objects.

11. The system recited in claim 9, wherein the predetermined value controls the threshold rank.

12. The system recited in claim 7, wherein each of the content objects contributed to the social network is created by the user contributing the content object.

13. One or more computer-readable tangible and non-transitory storage media embodying software operable when executed by one or more computer systems to:
access a plurality of user profiles corresponding to a plurality of users and a plurality of content objects, wherein:
the users belong to a social network; and
each of the users has contributed at least one of the content objects to the social network;
rank the users in descending order based on a number of content objects each of the users has contributed to the social network;
represent in log space ranks of the users versus in log space numbers of content objects contributed by the users;
determine a threshold rank based on an increasing rate of the ranks of the users, a decreasing rate of the numbers of content objects, and a predetermined value in the log space; and
identify from among the users, those users ranked at and above the threshold rank as high-volume content contributors for the social network.

14. The media recited in claim 13, wherein the ranks of the users versus the numbers of content objects contributed by the users is represented as a curve in the log space, within the ranks of the users are represented by x coordinates of the log space and the numbers of content objects contributed by the users are represented by y coordinates of the log space.

15. The media recited in claim 14, wherein:
the increasing rate of the ranks of the users is defined as $$\frac{dx}{x};$$

the decreasing rate of the numbers of content objects is defined as $$-\frac{dy}{y};$$

and
the threshold rank is determined based on $$-\frac{dy}{y} = \alpha \frac{dx}{x},$$

where α denotes the predetermined value.

16. The media recited in claim 15, wherein the threshold rank is where the increasing rate of the ranks of the users equals the decreasing rate of the numbers of content objects.

17. The media recited in claim 15, wherein the predetermined value controls the threshold rank.

18. The media recited in claim 13, wherein each of the content objects contributed to the social network is created by the user contributing the content object.

* * * * *